United States Patent [19]
Aleshire

[11] Patent Number: 4,773,628
[45] Date of Patent: Sep. 27, 1988

[54] CABLE PULLING SYSTEM

[75] Inventor: Ronald E. Aleshire, Miami, Fla.

[73] Assignee: FPL Qualtec, Inc., Palm Beach Gardens, Fla.

[21] Appl. No.: 93,099

[22] Filed: Sep. 1, 1987

Related U.S. Application Data

[63] Continuation of Ser. No. 787,988, Oct. 16, 1985, abandoned.

[51] Int. Cl.$^4$ ............................................. B65H 59/00
[52] U.S. Cl. .................................................. 254/134.4
[58] Field of Search ..................... 254/134.3 FT, 134.4

[56] References Cited

U.S. PATENT DOCUMENTS

| | | | |
|---|---|---|---|
| 122,082 | 12/1871 | Tassel . | |
| 355,675 | 1/1887 | Baldwin . | |
| 535,664 | 3/1895 | Bott . | |
| 721,889 | 3/1903 | Henderson et al. | 15/3.52 |
| 1,338,765 | 5/1920 | Brandt . | |
| 1,859,520 | 5/1932 | Maisel . | |
| 1,966,819 | 7/1934 | Irvin | 137/78 |
| 1,999,559 | 4/1935 | Brendlin | 15/104.06 |
| 2,852,323 | 9/1958 | Bowerman | 309/33 |
| 2,853,347 | 9/1958 | Cooper, Jr. | 309/17 |
| 2,911,270 | 11/1959 | White | 309/23 |
| 3,006,536 | 10/1961 | Chausson | 230/172 |
| 3,025,118 | 3/1962 | Ver Nooy | 309/4 |
| 3,091,433 | 5/1963 | Riley, Jr. . | |
| 3,148,597 | 9/1964 | Waldrop | 92/241 |
| 3,188,099 | 6/1965 | Johnson | 277/188 |
| 3,296,944 | 1/1967 | Taylor, Jr. | 92/180 |
| 3,301,531 | 1/1967 | Corsiglia | 254/134.4 |
| 3,585,076 | 6/1971 | Prange | 254/134.4 |
| 3,793,732 | 2/1974 | Hamrick | 33/137 R |
| 4,030,702 | 6/1977 | Ware et al. | 254/134.4 |
| 4,429,428 | 2/1984 | Van Dyk | 15/3.52 |

FOREIGN PATENT DOCUMENTS

| | | |
|---|---|---|
| 1047641 | 12/1958 | Fed. Rep. of Germany . |
| 2009942 | 10/1970 | Fed. Rep. of Germany . |
| 1950645 | 4/1971 | Fed. Rep. of Germany . |

OTHER PUBLICATIONS

Tamio Shindo, et al, "New Conduit Checker", pp. 238–242, Jul. 1980, Japan Telecommunications Review.
Cope Catalog (no date).

Primary Examiner—Frederick R. Schmidt
Assistant Examiner—Judy J. Hartman
Attorney, Agent, or Firm—Amster, Rothstein & Ebenstein

[57] ABSTRACT

A cable-pulling system for moving a cable through a conduit includes a birdie connected to the cable and formed to be located within the conduit, to be movable through the conduit and to create a fluid seal within said conduit. A supply of pressurized fluid is connected to one end of the conduit to create a pressurized region behind the birdie to urge the birdie to move to the opposite end of the conduit. Cable is supplied to permit the movement of the birdie through the conduit; however, the cable is supplied only in response to the existence of the pressurized region, and upon loss of the pressurized region the cable is no longer supplied and movement of the birdie is prevented.

15 Claims, 3 Drawing Sheets

CABLE PULLING SYSTEM

This application is a continuation of application Ser. No. 787,988, filed Oct. 16, 1985 now abandoned.

The invention relates to a system for inserting cable into a conduit and more particularly to an air-powered cable-pulling system.

The increased use of underground cable (e.g. telephone, electric and other utility cables) contained in buried conduit requires improved methods of moving the cable through sections of conduit which often exceed 100 feet in length. Presently, this is accomplished by blowing a lightweight guide line through the conduit using compressed air. The guide line is then used to pull a heavier-weight line which in turn is used to pull heavier rope which is then used to pull the actual cable through the conduit. This multistep process takes considerable effort and time. Typical installations require a four-man crew to work about two hours to pull a single primary cable through a 2" diameter conduit 600 feet in length. In addition, work is frequently delayed due to breaking of the guide lines and the damaging of sections of the conduit.

In response to the need for improved cable-pulling equipment, two types of alternative equipment have been developed over the past several years. While these two types of equipment constitute an improvement over the installation method described above, they are expensive, require specially trained operators and cannot be used in relatively inaccessible locations, e.g., underground vaults, electrical rooms and back yards. Specifically, in one type, a rodding machine is mounted on a truck or trailer and is used to push a ⅜" or ¼" spring steel rod through a section of conduit while rotating the rod at a low rate of speed. Normal payout of the rod is about 40 to 50 inches per minute. Upon reaching the end of the conduit, the electrical or communications cable is attached to the rod which is then pulled back through the conduit.

While this rodding type of equipment is useful in situations involving badly blistered or collapsed conduit, it incorporates the following severe disadvantages:

1. A long set-up time (15 to 30 minutes) is required;
2. Communication between the operator and the reel-tender is necessary for safe operation, in order to insure that the rod is stopped when it clears the receiving end of the conduit;
3. The payout of the rod is relatively slow;
4. The equipment cannot be used on conduit runs containing 24" radius 90° bends;
5. The equipment cannot be used in relatively inaccessible areas;
6. A specially trained operator is required, thereby limiting productivity and scheduling; and
7. The equipment is extremely expensive.

In a second type of cable-pulling equipment, a high-volume/low-pressure air blower, mounted on a trailer, is used to blow a plug-like device (referred to as a "birdie") through a conduit by the use of compressed air, with the birdie carrying one end of a steel guide line through the conduit. The steel guide line extends from a drum which is mounted for free rotation so as not to impede the progress of the birdie through the conduit. Once the birdie passes through the length of the conduit, the steel guide line is attached to the electrical or communications cable and pulled back through the conduit using a hydraulic-powered winch drum.

The disadvantages of this type of equipment include the following:

1. The uncontrolled payout (unwinding) of the steel guideline (frequently at a rate of over 1000 feet per minute) creates severe potential safety problems;
2. A specially trained operator is required;
3. The birdie cannot be blown through partially collapsed sections of conduit;
4. Because the equipment is mounted on a trailer, it cannot be used in relatively inaccessible areas; and
5. The equipment is extremely expensive.

Of the above disadvantages, perhaps the most severe is the uncontrolled unwinding of the steel guide line and therefore uncontrolled movement of the birdie through the conduit. In essence, the system operates as a compressed air gun which "shoots" the birdie through the conduit. The birdie exits the opposite end of the conduit at a high velocity and can cause severe damage. The safe operation of this system is dependent on the operator's ability to stop the freewheeling drum when the birdie exits the conduit and, as such, is especially sensitive to operator error.

Accordingly, it is an object of the present invention to provide an improved cable-pulling system which overcomes the defects inherent in prior art systems.

Another object of the present invention is to provide a cable-pulling system which is relatively portable and therefore useable in otherwise inacccesible areas.

Still another object of the present invention is to provide a cable-pulling system the operation of which results in a substantial savings of labor as compared to the operation of prior art devices.

A further object of the present invention is to provide a cable-pulling system which is safer than prior art systems.

A still further object of the present invention is to provide a cable-pulling system which may be quickly assembled, used and disassembled.

An additional object of the present invention is to provide a cable-pulling system which is simple to operate and does not require a specially trained operator.

An additional object of the present invention is to provide a cable-pulling system including an improved birdie capable of maintaining an airtight seal along irregular sections of conduit.

These and other objects are achieved, in accordance with the present invention, by moving a birdie connected to a supply of cable through a length of conduit with the birdie being formed so as to create a fluid seal within the conduit. Pressurized fluid (such as air) is introduced to a first end of the conduit so as to create a pressurized region within the conduit between the first end and the birdie, thereby urging the birdie through the conduit and to the opposite end thereof. Movement of the birdie is restricted, however, by the cable which is spooled out only in response to the existence of a threshold pressure in the region of the conduit between the first end and the birdie. Once the birdie exits the opposite end of the conduit, pressurization is lost, the cable is no longer spooled out and movement of the birdie is effectively stopped. As such, a controlled movement of the birdie through the conduit is achieved.

An additional feature of the present invention is the formation of the birdie from a first group of resilient fluid-impervious discs disposed in concentric, adjacent relationship, with at least one of the discs having a diameter slightly greater than the inside diameter of the conduit and another of the discs having a diameter substantially equal to the inside diameter of the conduit. This first group of discs is spaced from a second group of resilient fluid-impervious discs which are also disposed in concentric, adjacent relationship, with at least one of the discs having a diameter slightly greater than the inside diameter of the conduit and another of the discs having a diameter substantially equal to the inside diameter of the conduit. The birdie so formed provides a fluid-tight seal with the interior of the conduit notwithstanding the presence of obstructions or collapsed sections of conduit.

The above brief description as well as further objectives, features and advantages of the present invention will be more fully understood by reference to the following detailed description of the presently preferred, but nonetheless illustrative embodiments in accordance with the present invention, when taken in conjunction with the accompanying drawings, wherein.

Figure 1:
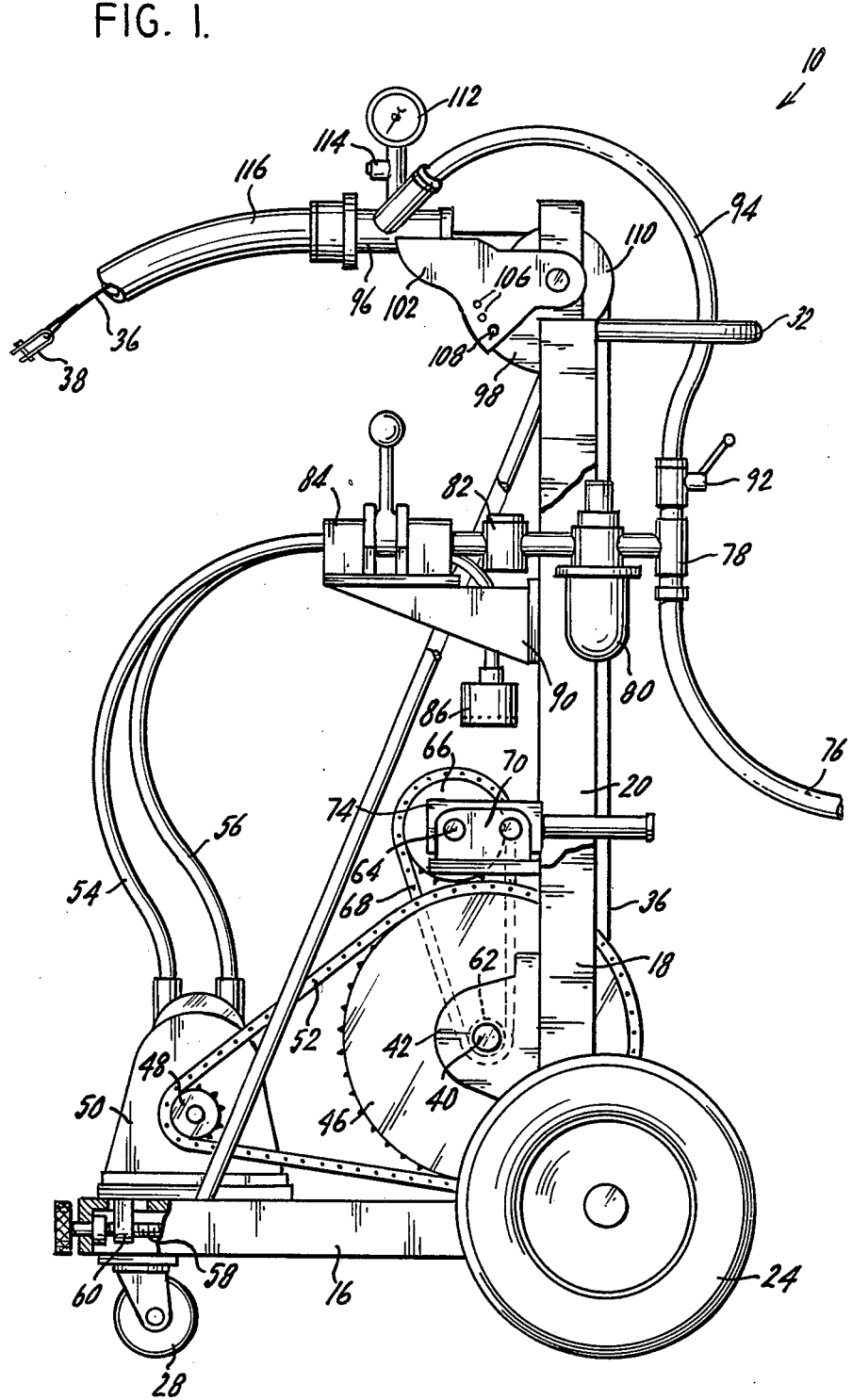
FIG. 1 is a fragmentary side elevation of the cable-pulling system of the present invention.
Figure 2:
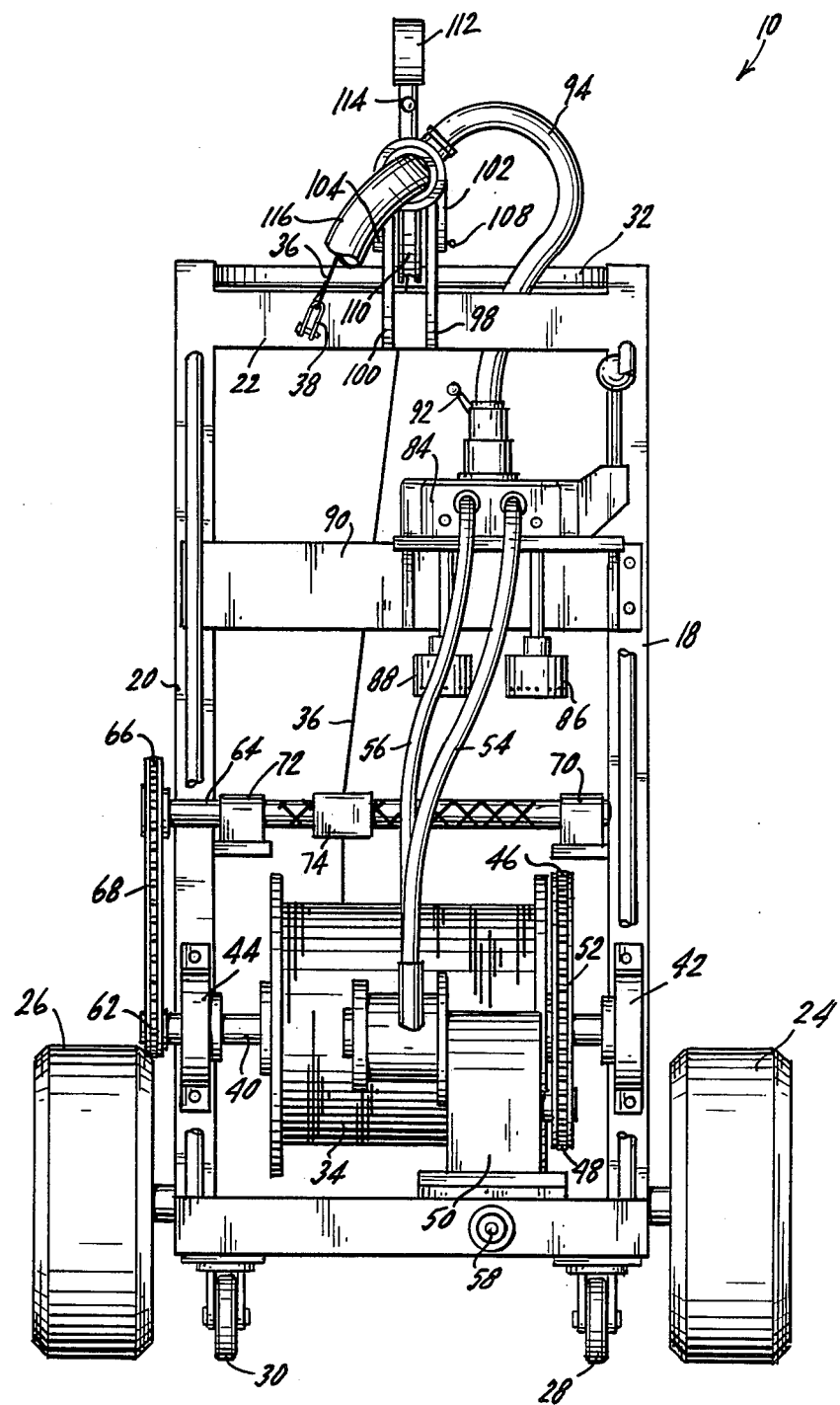
FIG. 2 is a fragmentary front elevation of the cable-pulling system of the present invention.
Figure 3:
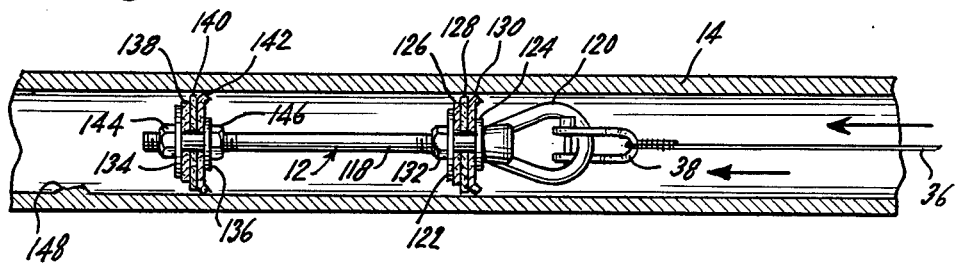
FIG. 3 is a sectional side elevation of the birdie used in the cable-pulling system of the present invention located within a portion of conduit.

Referring now to FIGS. 1-3, the cable-pulling system of the present invention may take the form of the portable unit shown in FIGS. 1 and 2 and indicated generally by the reference numeral 10. The system also includes a birdie 12 which is shown in FIG. 3 moving through a section of conduit 14. The portable unit 10 includes an L-shaped dolly formed from a horizontal platform 16 and vertical uprights 18 and 20 connected at their upper ends by a crossbar 22. Preferably, the platform 16 and uprights 18 and 20 are formed of aluminum and welded together. In order to facilitate mobility of the unit 10, platform 16 supports a pair of wheels 24 and 26, which are located proximate to respective uprights 18 and 20, and a pair of remote casters 28 and 30. In addition, a handle 32 extends between the upper ends of uprights 18 and 20. The use of the wheels 24 and 26 and casters 28 and 30 permits the unit 10 to stand upright and be maneuvered in small areas, such as transformer rooms. In addition, the unit 10 may be operated as a hand truck by tilting the unit back on wheels 24 and 26, thereby allowing the unit to be quickly moved over substantial distances.

A drum 34 mounted on unit 10 carries a supply of cable 36, preferably steel wire rope, one end of which is secured to the birdie 12 by use of a connector or clip 38. During operation of the cable-pulling system the birdie 12 is urged through the conduit 14, pulling the cable 36 therethrough, and payout or unwinding of the cable 36 from the drum is regulated in order to control the movement of the birdie 12. Specifically, the drum 34 is carried on an axle 40 which is rotatably supported on the unit 10 in a pair of bearings 42 and 44 mounted on respective uprights 18 and 20. Movement of the axle 40, and therefore movement of the drum 34, is controlled by a gear 46 mounted on the axle 40 and driven by the output gear 48 of a pneumatic motor 50 through a chain 52. As such, the winding and unwinding of the cable 36 from the drum 34 is achieved by operation of the pneumatic motor 50 which is controlled by the introduction of compressed air through tubes 54 and 56. The motor 50 may be formed with an internal rotor (not shown) which is driven by compressed air and which in turn drives output gear 48 through a suitable gear reducer. A lower horsepower air-powered gear motor which would pay out cable at 100 feet per minute is contemplated for use in 2" and 4" diameter conduit no greater than 700 feet in length. For 4", 5" and 6" diameter conduit a lower horsepower air-powered gear motor which would pay out cable at 50 feet per minute (the lower gearing would provide increased pulling power) is contemplated.

The motor 50 is constructed so that if pressurized air is supplied to the motor through tube 54, output gear 48 is driven to cause counterclockwise movement of the drum 34 and unwinding of the cable 36. Conversely, pressurized air supplied to the motor 50 through tube 56 results in clockwise movement of the drum 34 and rewinding of the cable 36 thereon. If pressurized air is not supplied to the motor 50 through either tubes 54 or 56, the motor 50 will act as a brake with respect to the drum 34 to prevent either the winding or unwinding of the cable 36.

As best seen in FIG. 1, adjustment of the tension of the chain 52 is accomplished by rotation of a lead screw 58 which is mounted on the platform 16. Rotation of the lead screw 58 results in movement of the motor 50 through a connector 60. As best seen in FIG. 2, in order to insure even winding and unwinding of the cable 36 across the drum 34, the drum axle 40 carries a gear 62 which is adapted to drive a rod 64 through a gear 66 which is secured to one end of the rod 64 and driven by a chain 68. Rod 64 is mounted for rotation in bearings 70 and 72, which are secured to respective uprights 14 and 16, and carries a cable guide 74. Rod 64 is threaded so that upon rotation guide 74 is moved back and forth along the rod so as to evenly wind and unwind the cable 36 from the drum 34.

An air compressor, not shown, is used to provide the pressurized air necessary for operating the motor 50 and, as will be described below, for moving the cable 36 through the conduit 14. The air compressor may be any standard unit capable of providing high-pressure/low-volume pressurized air, and compressors having an output of 150 to 175 CFM are preferred. The compressor supplies pressurized air to the system through a main supply line 76 which is secured to a T-connector 78 which forms part of the unit 10. One outlet of connector 78 supplies air to the tubes 54 and 56 through an air filter and regulator 80, an oil lubricator 82 and a motor control valve 84. Valve 84 permits air pressure to be supplied to tubes 54 and 56 to permit winding and unwinding of the cable 36. Mufflers 86 and 88 are provided for respective tubes 54 and 56 through which the respective tubes 54 and 56 exhaust to the atmosphere when not supplying air to the motor 50. For example, when valve 84 is operated to supply pressurized air to the motor 50 through line 54 in order to permit unwinding of the cable 36, tube 56 and muffler 88 serve as the exhaust for the motor. Similarly, when valve 84 is operated to supply pressurized air through tube 56 to operate the motor 50 to rewind the cable, tube 54 and muffler 86 serve as the exhaust for the motor. The valve 84 as well as the lubricator 82 and air filter and regulator 80 are carried on a shelf bracket 90 which extends between and is connected to uprights 18 and 20.

The other outlet of T-connector 78 provides air through an on/off valve 92 and a tube 94 to a pressurized air/cable junction assembly 96. Assembly 96 is adjustably connected to crossbar 22 through the use of a pair of shoulders 98 and 100 which extend upwardly from the crossbar 22 and which rotatably support a pair of arms 102 and 104 which are secured to opposite sides of assembly 96. Both the arms 102 and 104 and shoulders 98 and 100 are formed with corresponding openings 106 whereby the angular orientation of the assembly 96 may be fixed by the insertion of a pin 108 through the corresponding openings. Shoulders 98 and 100 also rotatably support a pulley 110 which serves as a guide for the cable 36. Arms 102 and 104 may support a lineal footage counter, not shown, in the region proximate to the pulley 110 for monitoring the amount of cable unwound from the drum 34.

Assembly 96 includes a pressure gauge 112 and an air-pressure escape valve 114 which serves as a safety feature by preventing extreme pressure build-up in the system. The cable 36 extends from the pulley 110 and enters the assembly 96 at one end through an airtight opening. A conduit extension tube 116 is secured to the opposite end of the assembly 96 and is adapted to supply both pressurized air and cable to the conduit 14.

During operation of the cable-pulling system the cable 36 is inserted into the assembly 96 and then secured to the birdie 12 by use of the clip 38. The birdie 12 is then inserted into one end of the conduit extension tube 116, which end is then secured to the assembly 96. The opposite end of the conduit extension tube 116 is then secured to the conduit 14, at which point the cable-pulling system is ready for operation. To institute operation, on/off valve 92 is opened to supply pressurized air to the conduit extension tube 116 through tube 94 and assembly 96. Since the birdie 12 forms an airtight seal with the interior walls of the conduit 14, the introduction of pressurized air into the region of the conduit 14 behind the birdie 12 would normally urge the birdie through the conduit. However, movement of the birdie 12 through the conduit 14 can only be accomplished by the concurrent operation of the motor 50, through valve 84 and tube 54, to permit unwinding of the cable 36 from the drum 34. Because of the use of the T-connector 78, air from the compressor is supplied simultaneously to both the conduit 14, through on/off valve 92, and to the motor 50 through motor control valve 84 and tube 54. Initially, the compressed air will travel to the region of the conduit behind the birdie 12. Once this area is pressurized, the compressed air will flow to the motor 50, powering the motor to rotate the drum 34 and unwind the cable 36, thereby permitting movement of the birdie 12 through the conduit 14.

The velocity of the birdie 12 through the conduit 14 is therefore regulated by the action of the motor 50 spooling out cable 36 from the drum 34. This is in contrast to the prior art method in which a high-volume/low-pressure air source is used to "shoot" a birdie through a conduit in a totally uncontrolled manner. As long as the birdie 12 remains in the conduit 14 the entire air system will remain pressurized and compressed air will continue to be supplied to the motor 50. Once the birdie 12 has moved through the entire length of the conduit 14 and exits the open end of the conduit the air system immediately opens and pressurization is lost. As a result, all of the compressed air supplied by the compressor exits through the open end of the conduit 14 and no compressed air is supplied to the motor 50. In the absence of a supply of compressed air, motor 50 immediately brakes the drum 34 to prevent further unwinding of the cable 36. The immediate braking of the drum 34 serves to stop the birdie 12 as soon as it exits the open end of the conduit 14. In this manner, the birdie 12 does not exit the conduit 14 as an uncontrolled projectile with the inherent safety problems. Instead, the birdie exits the conduit 14 and is immediately stopped by the action of the motor 50 preventing further unwinding of the cable 36 from the drum 34. As such, movement of the birdie 12 through and out of the conduit 14 proceeds in a controlled and safe manner.

Once the birdie 12 has pulled the cable 32 through the entire length of conduit 14 and has exited the conduit at the end remote from the unit 10, the cable-pulling system may be used to pull the cable 32, along with telephone, electric or other utility wires, back through the conduit 14. After the birdie exits the end of the conduit 14 remote from the unit 10, motor control valve 84 is operated to shut off the supply of compressed air to the motor 50 through either tube 54 or 56. On/off valve 92 is then moved to its off position to stop the flow of compressed air to the conduit 14 through tubes 94 and 116. Pin 38 is then operated to disconnect the birdie 12 from the cable 36, which is then connected to the specific wiring to be pulled through the conduit. Once the wiring is firmly secured to the cable, valve 84 is operated to supply compressed air to the motor 50 through tube 56, thereby causing the motor 50 to rotate the drum 34 so as to rewind the cable 36 thereon. As a result, the cable 36 and the wiring connected thereto are both carefully pulled through the entire length of the conduit 14. Since compressed air within the conduit 14 is not required for this operation, conduit extension tube 116 may be disconnected from the end of the conduit proximate to the unit 10 so as to permit viewing of the rewinding of the cable 36 and the pulling of the wiring back through the conduit 14. Once the wiring exits the end of the conduit proximate to the unit 10, the motor control valve 84 is operated to shut off the supply of compressed air to the motor 50, thereby stopping further movement of the drum 34 and cable 36. The wiring is then disconnected from the cable 36 and the unit 10 may be taken to the next job.

The construction of the birdie 12 is shown in detail in FIG. 3 and includes a rod 118 which is threaded at both ends. An eye nut 120 is connected to one end of the rod 118 and provides an attachment point for the clip 38 which carries the cable 36. Located proximate to the eye nut 120 is a pair of steel washers 122 and 124 which are spaced apart by three flexible sealing discs 126, 128 and 130. The discs may be formed of any flexible, durable, fluid-impervious material, such as plastic, rubber with fiber plies, neoprene etc., and each disc is shaped so as to conform to the interior of the conduit 14. Each of the discs, however, is formed with a different diameter. The middle disc 128 is formed with a diameter equal to the diameter of the conduit 14, the first or forward disc 126 is formed with a diameter slightly smaller than the diameter of the conduit 14 and the last or rearward disc 130 is formed with a diameter slightly larger than the diameter of the conduit 14. The discs are maintained in concentric, adjacent relationship with each other and with the washers 122 and 124, by the use of a nut 132. The end of the rod 118 remote from the eye nut 120 is similarly formed with a pair of steel washers 134 and 136 spaced by three flexible sealing discs 138, 140 and 142. Nuts 144 and 146 serve to maintain the washers 134 and 136 and discs 138, 140 and 142 in concentric, adjacent relationship with each other. The function of these two groups of sealing discs (126, 128, 130 and 138, 140, 142) is to insure that the birdie 112 creates a fluid seal (such as an air seal) with the conduit 14 regardless of whether the conduit is slightly collapsed, dented or includes obstructions 148.

The diameters of respective washers 122 and 134 are greater than the diameters of washers 124 and 136. Washers 122 and 134 are each located forward of their respective discs and serve to define the smallest-diameter tubing through which the birdie 12 may move. For example, if the tubing 14 is collapsed or dented to the extent that its effective diameter is less than the diameter of washers 134 and 122, the birdie will not pass through the conduit. As such, washers 122 and 134 should be sized to correspond to the minimum possible acceptable diameters of the conduit 14. The diameters of washers 136 and 124 are smaller than respective washers 134 and 122 in order to permit their respective discs to freely bend backwardly when the birdie passes through egg-shaped or collapsed sections of conduit or over obstructions 148.

The use of the three different-sized discs insures that the birdie 12 will maintain a seal with the conduit 14 in situations where the conduit 14 has been collapsed or dented so as to create an irregular inner circumference (egg-shaped) having, in some places, a diameter greater than the original diameter of the conduit 14. In these situations, the fluid seal is not lost because the larger diameter discs 130 and 142 expand to the larger diameter and maintain the seal. In addition, the use of two sets of sealing discs prevents the loss of fluid seal when the birdie 12 moves through collapsed or dented sections of conduit or over an obstruction 148. Specifically, the two sets of sealing discs each serve as back-up for the other to maintain the fluid seal. For example, if discs 138, 140 and 142 are unable to provide an effective fluid seal with the conduit 14 upon passing over obstruction 148, pressurization is not lost since discs 126, 128 and 130 continue to maintain the birdie's 12 seal with the conduit 14. As a result, the birdie 12 continues to travel through the conduit 14 and discs 138, 140 and 142 are moved past the collapsed or dented section of conduit or over the obstruction 148 and again resume their sealing action. The birdie's 12 fluid seal with the conduit 14 is similarly maintained even though the seal provided by the second set of discs 126, 128 and 130 may be lost when they move through the collapsed or dented section or over the obstruction 148. While either set of discs may, at any time, fail to provide an effective seal, the other set of discs will serve as a temporary back-up to maintain the seal between the birdie 12 and the conduit 14.

It will readily be appreciated that each set of sealing discs may contain more than three individual discs and that the discs of a set may be formed of different materials. In addition, should the birdie 12 encounter an obstruction or collapsed section of conduit 14 which prevents its passage, pressure build-up in the system will register on the pressure gauge 112 of unit 10 and eventually trigger air-pressure escape valve 114, to bleed off pressure so as to prevent any dangerous pressure build-up.

Figure 4:
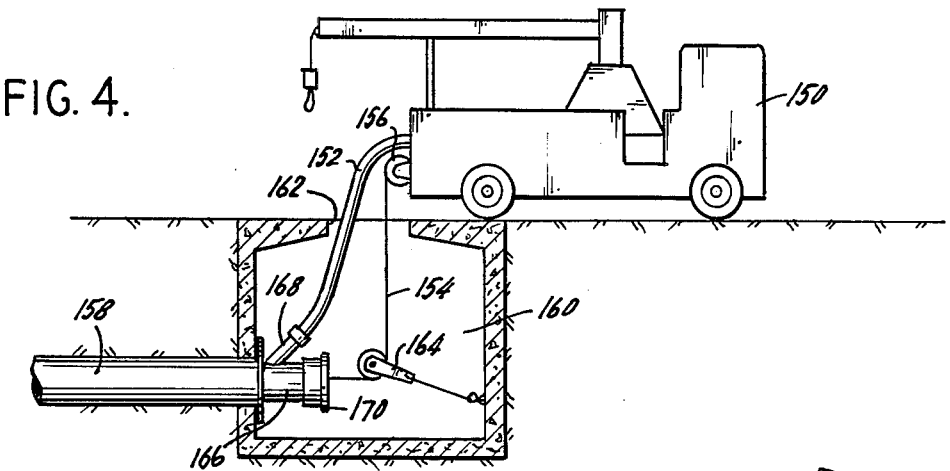
FIG. 4 is a fragmentary sectional side elevation of an alternate embodiment of the present invention shown during operation thereof.
Figure 5:
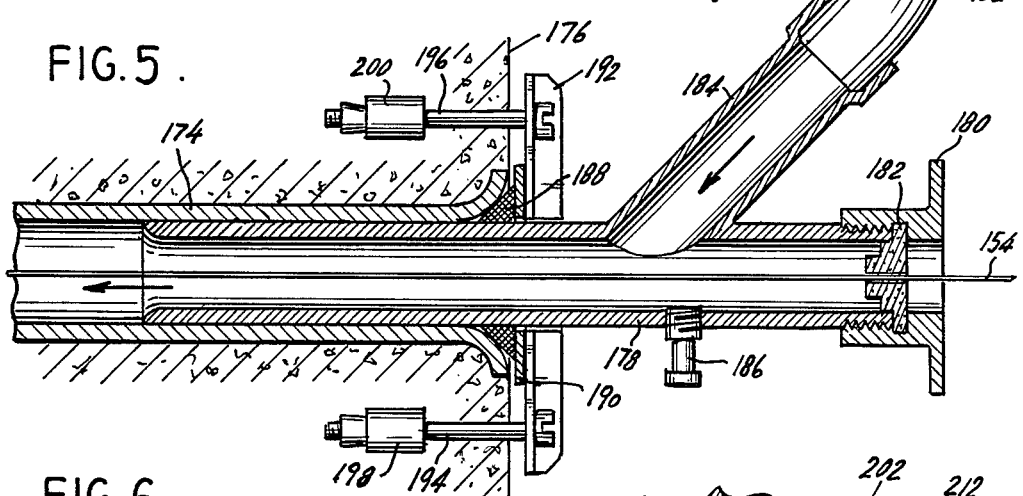
FIG. 5 is a fragmentary sectional side elevation of the portion of the cable-pulling system which is connected to the conduit.
Figure 6:
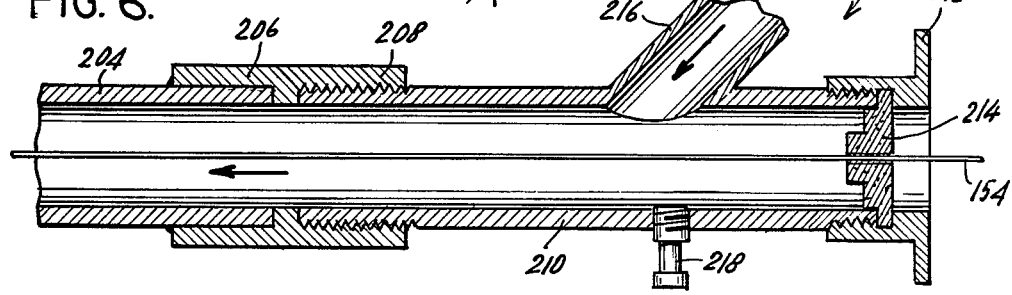
FIG. 6 is a fragmentary sectional side elevation of an alternate embodiment of the portion of the cable-pulling system which is connected to the conduit.

Referring now to FIGS. 4–6 the cable-pulling system of the present invention may be mounted on a vehicle, such as the vehicle shown in FIG. 4 and indicated generally by the reference numeral 150. Specifically, the portable unit 10 described above and modified so as not to include the pressurized air/cable junction assembly 96 may be mounted on the vehicle 150, having a conduit extension tube 152 which corresponds to conduit extension tube 116 of unit 10, a cable 154 which corresponds to cable 36 of unit 10 and a cable-guide pulley 156 which corresponds to pulley 110 of unit 10. The vehicle-mounted unit 150 may be used, for example, for moving the cable 154 through an underground conduit 158 having one end which opens into an underground room 160, access to the room being through a manhole opening 162. The vehicle-mounted unit 150 is particularly desirable in this type of application in view of the difficulty in moving the portable unit 10 through the manhole opening 162 and into the underground room 160. With the vehicle-mounted unit 150, the rear of the vehicle, from which the cable 154 and conduit extension tube 152 extend, may be located directly above the manhole opening 162 with the cable 154 and tube 152 extending down into the room 160. Additional pulleys and rigging 164 may be attached to the walls of the room 160 and used to properly position the cable 154 with respect to the open end of the conduit 158.

It will be readily appreciated, however, that an assembly similar to the pressurized air/cable junction assembly 96 is required in order to introduce both the pressurized air from tube 152 and the cable 154 into the conduit 158. This is accomplished by use of an airtight chute indicated generally in FIG. 4 by the reference numeral 166. Chute 166 is connected to the open end of the conduit 158 and includes an air inlet 168 which is connected to tube 152 to supply pressurized air and a cable inlet 170 which provides an airtight opening through which the cable 154 may enter the conduit 158.

The construction of the chute 166 may take many different forms for various applications, the specific requirements being that the chute be firmly secured to the open end of the conduit 158 so as not to "blow out" upon the introduction of compressed air and that the chute include airtight openings permitting entry of both the cable 154 and the compressed air. Referring now to FIG. 5, one form of airtight chute is indicated generally by the reference numeral 172 and is specifically well-suited for applications in which the open end of a conduit 174 is flush with a concrete wall 176. Chute 172 includes a tube 178 having a diameter slightly less than the diameter of the conduit 174 so that one end of the tube may be inserted therein. The opposite end of the tube is threaded and adapted to receive a cap 180 which includes an airtight cable guide 182. Guide 182 is formed so that movement of the cable 154 therethrough is accomplished without loss of compressed air so that the interior of the chute can remain pressurized. Chute 172 also includes an air inlet connector 184 to which one end of the conduit extension tube 152 is secured, as well as an air-pressure escape valve 186 which serves as a safety feature by preventing extreme pressure build-up in the system.

The tube 178 is held in place within the conduit 174 and a fluid seal is effected therebetween through the use of a seal 188, such as a rubber gasket, which is disposed between the exterior portion of the tube 178 and the open end of the conduit 174. A washer 190 is placed over the seal 188 and a support bracket 192 contacts the washer 190 to urge the gasket 188 into sealing engagement with the open end of the conduit 174. Bracket 192 is secured to the wall 176 by the use of bolts 194 and 196 which are received in expanding plugs 198 and 200 set in the wall 176.

Referring now to FIG. 6, a chute indicated generally by the reference numeral 202 is particularly well-suited for use in situations where the open end of a conduit 204 extends outwardly from a wall and is freely accessible. In this situation, a collar 206 is cemented or otherwise secured to the end of the conduit 204 and formed with an internally threaded opening 208 to which chute 202 is secured. Specifically, the chute 202 is formed from a tube 210 having external threads at both ends thereof for attachment of one end of the tube to the collar 206 and the other end of the tube to a cap 212. Cap 212 includes an airtight cable guide 214 which permits movement of the cable 154 into the conduit 204 without loss of compressed air. Chute 202 is also formed with an air-inlet connector 216 which receives the conduit extension tube 152 and permits compressed air to enter the conduit 204. The chute 202 also includes an air-pressure escape valve 218 which serves as a safety feature by preventing extreme pressure build-up in the system.

Use of either of the chutes 172 or 202 requires that the chute be secured to the conduit as described above. Respective caps 180 and 212 are then screwed off and the cable 154 (without the birdie 12 attached thereto) is threaded through respective guides 182 and 214. The birdie 12 may then be connected to the cable 154 and placed in the open end of respective tubes 178 and 210. The birdie 12 should be pushed past the respective air-inlet connectors 184 and 216 by use of a suitable rod, and may even be pushed into respective conduits 174 and 204. Once the birdie is appropriately situated within either respective tubes 178 or 210 or respective conduits 174 or 204, respective caps 180 and 212 are replaced and the cable-pulling system may then be operated in the same manner as described for unit 10 to move the birdie 12 through either conduit 174 or 204, pulling the cable 154 therethrough. The chutes 172 and 202 may be removed from the end of the conduit 152 during the rewinding of the cable 154 and the pulling of wiring back through the conduit 152.

As will be readily apparent to those skilled in the art, the invention may be used in other specific forms or for other purposes without departing from its spirit or central characteristics. The present embodiments are therefore to be considered as illustrative and not restrictive, the scope of the invention being indicated by the claims rather than by the foregoing description, and all embodiments which come within the range of equivalence of the claims are intended to be embraced.

What is claimed is:

1. Apparatus for moving a cable through a conduit comprising:
    (a) a bridie connected to said cable, said birdie being dimensioned to be located within said conduit, to be movable through said conduit and to create a fluid seal within said conduit,
    (b) means for providing pressurized fluid to one end of said conduit to create a pressurized region behind said bridie to urge said birdie to move to the opposite end of said conduit, and
    (c) means for supplying cable, only in the presence of said pressurized region behind said birdie including automatic pressure responsive motor means operatively connected to and activated by said means for providing pressurized fluid such that said motor means further acts a a braking means for preventing the supply of said cable in the absence of said pressurized region behind said birdie so as to permit controlled movement of said birdie through said conduit,
    whereby said birdie moves through said conduit at a controlled rate of speed until it emerges from said opposite end of said conduit at which point said pressurized region is eliminated and further movement of said birdie is prevented.

2. Apparatus as in claim 1 in which said means for supplying cable comprises a supply of cable, and a motor operable to cause spooling-out of said cable from said supply at a predetermined rate of speed only in response to the existence of said pressurized region.

3. Apparatus as in claim 2 in which said supply of cable comprises a drum carrying a supply of said cable, said motor controlling the movement of said drum and therefore the spooling-out of said cable.

4. Apparatus as in claim 2 in which said motor operates on pressurized fluid and a supply line of pressurized fluid to said motor includes said pressurized region, whereby the absence of the pressurized region terminates the supply line of pressurized fluid to said motor thereby preventing its operation.

5. Apparatus as in claim 2 in which said motor can be operated to reel in said cable.

6. Apparatus as in claim 1 in which said pressurized fluid is high-pressure/low-volume pressurized fluid.

7. Apparatus for moving a birdie connected to a cable through a conduit, said birdie being formed to be located within said conduit, to be movable through said conduit and to create a fluid seal within said conduit, comprising:
    (a) means for providing pressurized fluid to one end of said conduit to create a pressurized region behind said birdie to urge said birdie to move to the opposite end of said conduit,
    (b) means for supplying cable, only in the presence of said pressurized region behind said birdie including automatic pressure responsive motor means operatively connected to and activated by said means for providing pressurized fluid such that said motor means further acts a braking means for preventing the supply of said cable in the absence of said pressurized region so as to permit controlled movement of said birdie through said conduit,
    whereby said birdie moves through said conduit at a controlled rate of speed until it emerges from said opposite end of said conduit at which point said pressurized region is eliminated and further movement of said birdie is prevented.

8. Apparatus as in claim 7 in which said means for supplying cable comprises a supply of cable, and a motor operable to cause spooling-out of said cable from said supply at a predetermined rate of speed only in response to the existence of said pressurized region.

9. Apparatus as in claim 8 in which said supply of cable comprises a drum carrying a supply of said cable, said motor controlling the movement of said drum and therefore the spooling-out of said cable.

10. Apparatus as in claim 8 in which said motor operates on pressurized fluid and a supply line of pressurized fluid to said motor includes said pressurized region, whereby the absence of the pressurized region terminates the supply line of pressurized fluid to said motor, thereby preventing its operation.

11. Apparatus as in claim 7 in which said motor can be operated to reel in said cable.

12. Apparatus as in claim 7 in which said pressurized fluid is high-pressure/low-volume pressurized fluid.

13. Apparatus for moving a cable through a conduit comprising:
   (a) a birdie connected to said cable, said birdie being dimensioned to be located within said conduit, to be movable through said conduit and to create a fluid seal within said conduit,
   (b) means for providing pressurized fluid to one end of said conduit to create a pressurized region behind said birdie to urge said birdie to move to the opposite end of said conduit,
   (c) a motor operatively connected to and activated by said means for providing pressurized fluid, said motor being activated only in response to a supply of said pressurized fluid and in the presence of said pressurized region behind said birdie, such that said motor further acts as a braking means for preventing the supply of said cable in the absence of said pressurized region, so as to permit controlled movement of said birdie through said conduit, and
   (d) a supply line of pressurized fluid to said motor including said pressurized region,
   whereby the elimination of said pressurized region terminates said supply line of pressurized fluid to said motor, thereby terminating operation of said motor and the supplying of cable.

14. Apparatus for moving a birdie connected to a cable through a conduit, said birdie being formed to be located within said conduit, to be movable through said conduit and to create a fluid seal within said conduit, comprising:
   (a) means for providing pressurized fluid to one end of said conduit to create a pressurized region behind said birdie to urge said birdie to move to the opposite end of said conduit,
   (b) a motor operatively connected to and activated by said means for providing; pressurized fluid, said motor being activated in response to a supply of said pressurized fluid and in the presence of said pressurized region behind said birdie, such that said motor further acts as a braking means for preventing the supply of said cable in the absence of said pressurized region, so as to permit controlled movement of said birdie through said conduit, and
   (c) a supply line of pressurized fluid to said motor including said pressurized region,
   whereby the elimination of said pressurized region terminates the supply line of pressurized fluid to said motor, thereby terminating operation of said motor and the supplying of cable.

15. Apparatus for moving a cable through a conduit comprising:
   (a) a birdie connected to said cable, said birdie being dimensioned to be located within said conduit, to be movable through said conduit and to create a fluid seal within said conduit,
   (b) means for providing high-pressure/low-volume pressurized fluid to one end of said conduit to create a pressurized region behind said birdie to urge said birdie to move to the opposite end of said conduit, and
   (c) means for supplying cable, only in the presence of said pressurized region behind said birdie including automatic pressure responsive motor means operatively connected to and activated by said means for providing pressurized fluid such that said motor means further acts a a braking means for preventing the supply of said cable in the absence of said pressurized region behind said birdie so as to permit controlled movement of said birdie through said conduit, whereby said birdie moves through said conduit at a controlled rate of speed until it emerges from said opposite end of said conduit at which point said pressurized region is eliminated and further movement of said birdie is prevented.

* * * * *